Dec. 29, 1931.   F. WANDER, JR   1,839,005
ROTARY WING FOR AEROPLANES
Filed Nov. 12, 1930
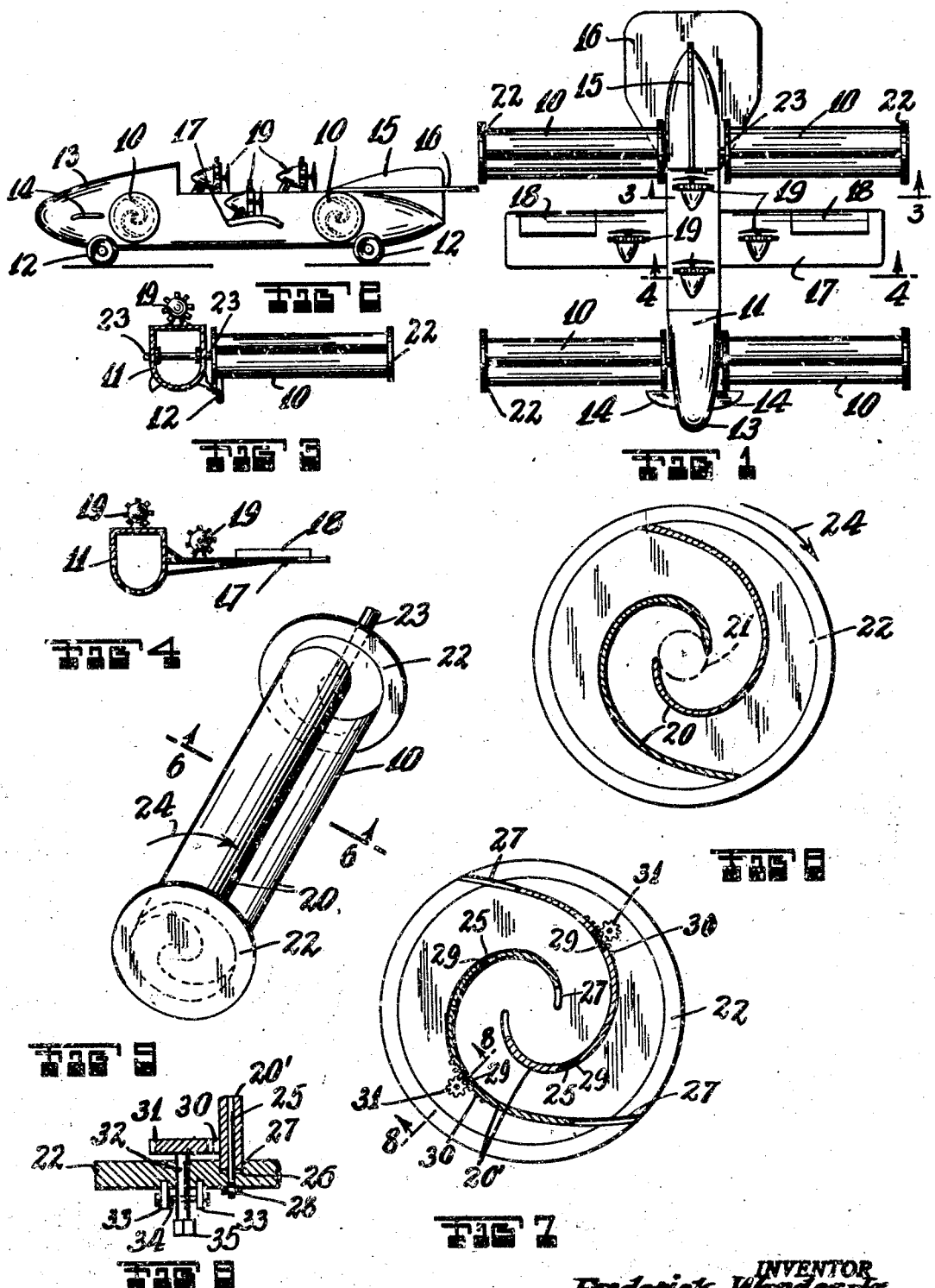

Patented Dec. 29, 1931

1,839,005

UNITED STATES PATENT OFFICE

FREDERICK WANDER, JR., OF NEW YORK, N. Y.

ROTARY WING FOR AEROPLANES

Application filed November 12, 1930. Serial No. 495,063.

This invention relates to new and useful improvements in a rotary wing for aeroplanes.

The invention has for an object the provision of a pair of longitudinal members of uniform transverse sections throughout their lengths and being in the form of a pair of similar spirals starting at a point 180° on the circumference of a small circle and directed away from the center of the circle 180° from each other, and end discs attached upon the ends of said spiral so that when the wing is rotated to cause different pressures above and below to lift an aeroplane provided with one or more of such wings.

It is a further object of this invention to provide a means for adjusting the size of the channel between the spiral members for changing the action of the wing. As a still further object of this invention it is proposed to provide a rotary wing of the class described which is of simple, durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a plan view of an aeroplane with rotary wings constructed according to this invention.

Fig. 2 is a side elevational view of Fig. 1.

Fig. 3 is a fragmentary vertical transverse sectional view taken on the line 3—3 of Fig. 1.

Fig. 4 is a fragmentary transverse sectional view taken on the line 4—4 of Fig. 1.

Fig. 5 is a perspective view of one of the wings used in the aeroplane in the previous figures, per se.

Fig. 6 is a transverse detailed sectional view taken on the line 6—6 of Fig. 5.

Fig. 7 is a view similar to Fig. 6, but illustrating a modification.

Fig. 8 is a fragmentary enlarged sectional view taken on the line 8—8 of Fig. 7.

In Figs. 1 to 4 inclusive, an aeroplane has been illustrated provided with rotary wings 10 constructed according to this invention. The aeroplane may be recognized by its body 11 supported upon landing gears 12. It is provided at the front with a rudder 11 and elevators 14. At the rear it is provided with a rudder 15 and elevators 16. Stationary central wings 17 are attached on opposite sides of the body 11 and support ailerons 18 for aiding in the control of the machine. Motor driven propellers 19 are shown mounted upon the body 11 and upon the stationary wings 17. The other details of the machine are not shown, since they form no part of this invention. The aeroplane illustrated is provided with four of the rotary wings 10 arranged two on a side and to the front and the rear of the stationary wings 17.

Each of the rotary wings comprises a pair of curved longitudinal members 20 of uniform transverse section throughout their lengths and in the form of spirals starting on points on the circumference of a small circle indicated by the dot and dash lines 21 and 180° from each other and directed away at 180°, a pair of discs 22 disposed on the ends of the said members 20 with their centers coaxially with the center of said circle 21, and means 23 for supporting the wing for rotation about said center constituting its axis.

In the form of the device illustrated in Figs. 1 to 6, the discs 22 are fixedly and rigidly attached upon the ends of the members 20. The means for supporting the wing for rotation about its axis constitutes a shaft indicated by the reference numeral 23. This shaft should be rotatively supported and suitable bearings, not shown on the drawings, connected with motors, also not illustrated. The rotatable wings should be rotated in the direction of the arrow 24 in Figs. 5 and 6. When thus rotated, currents of air will be set up and certain of these currents will pass through between the spiral members.

In the modified form of the device illustrated in Figs. 7 and 8, a means has been shown for adjusting the size of the channel between the spiral members. In this form of the invention the discs 22 are held spaced from each other by rods 25. Collars 26 are fixed near the ends of the rods 25 and engage in grooves 27 formed in the discs, and coact with nuts 28 upon the outer ends of the rods and disposed on the outer faces of the discs for accomplishing the spaced holding of the parts. The grooves 27 are in the form of spirals so as to correspond with the shape of the curved longitudinal members 20. These curved members are of flexible material so that they may be moved along in the grooves and assume shapes as directed. Slots 29 are formed within the curved members 20 for the passage of the rods 25. Rack teeth 30 are arranged upon the ends of the members 20 and mesh with pinions 31 fixed on shafts 32 rotatively engaged through the discs.

A means is provided for holding the shafts 32 against rotation, and comprises anchor pins 33 projecting from the discs and supporting bolts 34 engaged through the shafts 32. Heads 35 are arranged upon the shafts 32 for receiving a turning tool to adjust the positions of the curved members 20 when the bolts 34 are removed. A change in the relative positions of the members 20 will effect the size of the channels between these members.

The operation of the aeroplane consists in operating the rotary wings in conjunction with the motor driven propellers, whereby vacuum is created above the rotary wings and pressure below the wings to help the flying machine rise. The air currents set up by the rotary wings pass through the channels between the longitudinal curved members to form the vacuum and pressure sides. Adjustments of the relative positions of the curved longitudinal member will change the lifting qualities of the wings to meet different conditions of flying.

It is to be understood that any number of my rotors may be used on a flying machine and arranged in any suitable location also that the shape, length and angle of the curved longitudinal members 20 may be varied as desired. Although it is intended that the said members preferably occupy an angle of between 180° and 270° in cross section, shorter or longer curves may also be used.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of discs disposed on the ends of said members with their centers in line with the center of said circle, and means for supporting said wing for rotation about said center constituting its axis, said spiral members meeting said supporting means for preventing any air connection between said members.

2. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of discs disposed on the ends of said members with their centers in line with the center of said circle, and means for supporting said wing for rotation about said center constituting its axis, comprising a shaft attached coaxially with one of said discs, said spiral members meeting said supporting means for preventing any air connection between said members.

3. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of discs disposed on the ends of said members with their centers in line with the center of said circle, means for supporting said wing for rotation about said center constituting its axis, and means for adjusting the relative position of said longitudinal members.

4. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of discs disposed on the ends of said members with their centers in line with the center of said circle, means for supporting said wing for rotation about said center constituting its axis, and means for adjusting the relative positions of said longitudinal members, comprising rods with collars and bolts for holding the disc in spaced positions, said longitudinal curved members being supported in spiral grooves formed in said disc, and means for holding said members in various positions within the grooves.

5. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of discs disposed on the ends of said members with their centers in line with the center of said circle, means for supporting said wing for rotation about said center constituting its axis, and means for adjusting the relative positions of said longitudinal members, comprising rods with collars and bolts for holding the disc in spaced positions, said longitudinal curved members being supported in spiral grooves formed in said disc, and means for holding said members in various positions within the grooves, comprising rack teeth formed on the members engaging pinions fixed on shafts engaged through the discs, and means for holding the shafts against rotation.

6. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of discs disposed on the ends of said members with their centers in line with the center of said circle, means for supporting said wing for rotation about said center constituting its axis, and means for adjusting the relative positions of said longitudinal members, comprising rods with collars and bolts for holding the disc in spaced positions, said longitudinal curved members being supported in spiral grooves formed in said disc, and means for holding said members in various positions within the grooves, comprising rack teeth formed on the members engaging pinions fixed on shafts engaged through the discs, and means for holding the shafts against rotation comprising anchor pins projecting from the discs, and means engaging thru said pins and said shafts.

7. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of discs disposed on the ends of said members with their centers in line with the center of said circle, means for supporting said wing for rotation about said center constituting its axis, and means for adjusting the relative positions of said longitudinal members, comprising rods with collars and bolts for holding the disc in spaced positions, said longitudinal curved members being supported in spiral grooves formed in said disc, and means for holding said members in various positions within the grooves, comprising rack teeth formed on the members engaging pinions fixed on shafts engaged through the discs, and means for holding the shafts against rotation comprising anchor pins projecting from the discs, and means engaging thru said pins and said shafts comprising supporting bolts.

8. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of discs disposed on the ends of said members with their centers in line with the center of said circle, means for supporting said wing for rotation about said center constituting its axis, and means for adjusting the relative positions of said longitudinal members, comprising rods with collars and bolts for holding the disc in spaced positions, said longitudinal curved members being supported in spiral grooves formed in said disc, and means for holding said members in various positions within the grooves, comprising rack teeth formed on the members engaging pinions fixed on shafts engaged through the discs, against rotation, and means for manually rotating said shafts.

9. A rotary wing for aeroplanes and the like, comprising a pair of curved longitudinal members of uniform transverse section throughout their lengths and in the form of spirals starting on points on the circumference of a circle 180° from each other and directed away at 180° from each other, a pair of sides disposed on the ends of said members with their centers in line with the center of said circle, means for supporting said wing for rotation about said center constituting its axis, and means for adjusting the relative positions of said longitudinal members, comprising rods with collars and bolts for holding the disc in spaced positions, said longitudinal curved members being supported in spiral grooves formed in said disc, and means for holding said members in various positions within the grooves, comprising rack teeth formed on the members engaging pinions fixed on shafts engaged through the discs, against rotation comprising heads fixed upon the shafts and adapted for receiving a turning tool.

In testimony whereof I have affixed my signature.

FREDERICK WANDER, Jr.